(12) United States Patent
Larson et al.

(10) Patent No.: US 7,555,473 B2
(45) Date of Patent: *Jun. 30, 2009

(54) PARTIAL PRE-AGGREGATION IN RELATIONAL DATABASE QUERIES

(75) Inventors: Per-Ake Larson, Redmond, WA (US); Cesar A. Galindo-Legaria, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 362 days.

This patent is subject to a terminal disclaimer.

(21) Appl. No.: 11/082,392

(22) Filed: Mar. 17, 2005

(65) Prior Publication Data

US 2005/0240556 A1 Oct. 27, 2005

Related U.S. Application Data

(63) Continuation of application No. 09/608,395, filed on Jun. 30, 2000, now Pat. No. 7,133,858.

(51) Int. Cl.
G06F 17/30 (2006.01)
G06F 7/00 (2006.01)
(52) U.S. Cl. .............................. 707/3; 707/2
(58) Field of Classification Search ........................ None
See application file for complete search history.

(56) References Cited

U.S. PATENT DOCUMENTS

| 5,511,190 | A | * | 4/1996 | Sharma et al. ................. 707/1 |
| 5,589,559 | A | | 12/1996 | Saito et al. |
| 5,598,559 | A | | 1/1997 | Chaudhuri |
| 5,781,896 | A | | 7/1998 | Dalal |
| 5,832,475 | A | * | 11/1998 | Agrawal et al. ................. 707/2 |
| 6,029,163 | A | * | 2/2000 | Ziauddin ....................... 707/2 |
| 6,032,144 | A | | 2/2000 | Srivastava et al. |
| 6,115,705 | A | | 9/2000 | Larson |
| 6,199,063 | B1 | | 3/2001 | Colby et al. |
| 6,260,037 | B1 | | 7/2001 | Bestgen et al. |
| 6,282,541 | B1 | * | 8/2001 | Hoa et al. ....................... 707/7 |
| 6,397,204 | B1 | | 5/2002 | Liu et al. |
| 6,430,550 | B1 | | 8/2002 | Leo et al. |
| 6,460,027 | B1 | | 10/2002 | Cochrane et al. |
| 6,480,836 | B1 | | 11/2002 | Colby et al. |
| 6,493,699 | B2 | | 12/2002 | Colby et al. |

(Continued)

OTHER PUBLICATIONS

Gray et al., "Data Cube: A Relational Aggregation Operator Generalizing Group-By, Cross-Tab, and Sub-Totals", Microsoft Research Technical Report MSR-TR-95-22, Feb. 5, 1995.*

(Continued)

*Primary Examiner*—Charles Rones
*Assistant Examiner*—Alicia M Lewis
(74) *Attorney, Agent, or Firm*—Lee & Hayes, PLLC

(57) ABSTRACT

A partial pre-aggregation database operation improves processing efficiency of database queries by reducing the number of records input into a subsequent database operation, provided the query includes a final aggregation. A query optimizer is provided to determine when it is economical to partially pre-aggregate data records and when it is not. The partial pre-aggregation creates a record store in memory as input records are received. The record store is then used by another database operator, which saves the other database operator from having to re-create the record store.

12 Claims, 8 Drawing Sheets

U.S. PATENT DOCUMENTS

| | | |
|---|---|---|
| 6,496,819 B1 | 12/2002 | Bello et al. |
| 6,625,593 B1 | 9/2003 | Leung et al. |
| 2001/0013030 A1 | 8/2001 | Colby et al. |
| 2002/0077997 A1 | 6/2002 | Colby et al. |

OTHER PUBLICATIONS

Chaudhuri, et al., "Including Group-By in Query Optimization," VLDB Conference 1994, pp. 354-366.

Larson, "Grouping and Duplicate Elimination: Benefits of Early Aggregation," Technical Report MSR-TR-97-36, 1997, (available at http://www.research.microsoft.com/pubs), pp. 1-25.

O'Neil, et al., "The LRU-K Page Replacement Algorithm For Database Disk Buffering," SIGMOD 93, 1993, pp. 1-10.

Shatdal, et al., "Adaptive Parallel Aggregation Algorithms," SIGMOD 1995, pp. 104-114.

Yan, et al., "Eager Aggregation and Lazy Aggregation," VLDB 95, 1995, pp. 345-357.

Yan, et al., "Performing Group-By before Join," Proc. 1994 International Conference on Data Engineering, Houston, Texas, 1994, pp. 89-100.

U.S. Appl. No. 11/082,390 Office Action mailed May 16, 2007.

Knuth, "The Art of Computer Programming," vol. 3, Sorting and Searching, (2nd Ed), Addison-Wesley, 1998.

\* cited by examiner

PARTIAL PRE-AGGREGATION
(STEP 206, FIG. 2)

|  | Customer Number | Invoice Date | Due Date | Invoice Amount | |
|---|---|---|---|---|---|
| Record 1 | 9810 | | | $100 | — 402 |
| Record 2 | 9815 | | | $200 | — 404 |
| Record 3 | 9810 | | | $300 | — 406 |
| Record 4 | 9821 | | | $400 | — 408 |
| Record 5 | 9810 | | | $500 | — 410 |
| Record 6 | 9821 | | | $600 | — 412 |
| | 414 | 416 | 418 | 420 | |

Sales Table
(Customer Invoices)

|  | Customer Number | Customer Name | Customer Contact | Contact Phone | |
|---|---|---|---|---|---|
| Record 1 | 9810 | | Adams | 123-4567 | — 502 |
| Record 2 | 9815 | | Bethard | 345-6789 | — 504 |
| Record 3 | 9819 | | Gill | 987-6543 | — 506 |
| Record 4 | 9821 | | Danner | 765-4321 | — 508 |
| | 510 | 512 | 514 | 516 | |

Customer Table
(Customer Contacts/Country)

|  | Customer Number | Total Invoice Amount |  |
|---|---|---|---|
| Record 1 | 9810 | $400 | — 602 |
| Record 2 | 9815 | $200 | — 604 |

606 ⟶ (Customer Number column)  608 ⟶ (Total Invoice Amount column)

First Group of Aggregation Records
Output To Join Operator

*Fig. 6a*

|  | Customer Number | Total Invoice Amount |  |
|---|---|---|---|
| Record 1 | 9821 | $1000 | — 610 |
| Record 2 | 9810 | $500 | — 612 |

614 ⟶ (Customer Number column)  616 ⟶ (Total Invoice Amount column)

Second Group of Aggregation Records
Output To Join Operator

Partial Pre-Aggregation Results

*Fig. 6b*

|  | Customer Number | Customer Contact | Contact Phone | Total Sales |  |
|---|---|---|---|---|---|
| Record 1 | 9810 | Adams | 123-4567 | $400 | ← 702 |
| Record 2 | 9815 | Bethard | 345-6789 | $200 | ← 704 |
| Record 3 | 9821 | Danner | 987-6543 | $1000 | ← 706 |
| Record 4 | 9810 | Adams | 123-4567 | $500 | ← 708 |
|  | 710 | 712 | 714 | 716 |  |

Join Results

|  | Customer Number | Customer Contact | Contact Phone | Total Sales |  |
|---|---|---|---|---|---|
| Record 1 | 9810 | Adams | 123-4567 | $900 | ← 802 |
| Record 2 | 9815 | Bethard | 345-6789 | $200 | ← 804 |
| Record 3 | 9821 | Danner | 987-6543 | $1000 | ← 806 |
|  | 808 | 810 | 812 | 814 |  |

Aggregation Results

|  | Customer Number | Customer Contact | Contact Phone | Total Sales | |
|---|---|---|---|---|---|
| Record 4 | 9810 | Adams | 123-4567 | $900 | — 980 |
| Record 5 | 9815 | Bethard | 345-6789 | $200 | — 982 |
| Record 6 | 9821 | Danner | 765-4321 | $1000 | — 984 |
|  | 986 | 988 | 990 | 992 |  |

Result Of Aggregation On Records
Output From Record Store

*Fig. 10*

PARTIAL PRE-AGGREGATION IN RELATIONAL DATABASE QUERIES

RELATED APPLICATIONS

This patent application claims priority to U.S. patent application Ser. No. 09/608,395, now U.S. Pat. No. 7,133,858, titled "Partial Pre-Aggregation in Relational Database Queries", filed on Jun. 30, 2000 and issued on Nov. 7, 2006, commonly assigned herewith, and hereby incorporated by reference.

TECHNICAL FIELD

This invention relates to relational database systems and, more particularly, to relational database queries utilizing aggregation operations.

BACKGROUND

Relational database systems are a type of database or database management system that stores information in tables—rows and columns of data. Typically, the rows of a table represent records (collections of information about separate items) and the columns represent fields (particular attributes of a record). An example of a relational database system is the SQL (Structured Query Language) Server database system manufactured and sold by Microsoft Corporation.

Database programs utilize queries to perform searches on one or more databases. Queries are composed of operators that perform a function involving one or more tables. One particular type of query that is frequently used in relational database systems groups records according to the value of one or more columns in the records. A query of this type is often referred to as an aggregation operation, an aggregation query or, simply, an aggregation ("GROUP BY" in SQL). As an example, suppose a business administrator wants to compute a sales total for a set of customers from a number of invoices. Each record represents one invoice and contains, among other things, a customer number and a dollar amount. The administrator might formulate an aggregation query that groups the invoices according to customer number and sums the dollar amounts on the invoices for each customer.

Other operators can be utilized together with an aggregation to perform a more sophisticated query on one or more tables. One such operator is a join operation, also referred to as a join query or a join. A join operation takes information in one table and combines that information with related information in another table. In the example given above, suppose the administrator would also like to see the name of the customer and the phone number of a customer contact (person) for each customer together with the total sales information for the customer. Suppose, also, that the customer name and customer contact information are not listed in the sales table that contains the sales figures—they are listed in a customer table, which contains, among other things, the customer name and contact information for the customer.

In this case, a join operation is first performed to combine the customer name and contact information with the invoice information. Subsequently, the aggregation operation calculates the total sales per customer as outlined above, and the administrator has a result that shows the customer name, the phone number of the customer contact person, and the total sales for that customer. There is, however, a significant cost to performing the join followed by the aggregation, due to the time necessary to perform certain input/output (I/O) operations.

The data records of a database are commonly stored on disk arrays or other forms of non-volatile memory. Queries performed on relational databases, such as the aggregation query, require that all data records be loaded into volatile memory (i.e., random access memory, or "RAM") for processing. However, relational databases often contain a large amount of data, which surpasses the volatile memory resources. As a result, records are loaded into volatile memory in batches to create a "record store," and large intermediate results must frequently be written to non-volatile memory such as a disk. Transferring large amounts of data between volatile and non-volatile memory significantly increases the cost of processing a query.

This cost problem is compounded in the case of the query having a join followed by an aggregation. Consider the situation if the sales table contains one million invoices and there are ten thousand different customer records in the customer table. It is doubtful that there is sufficient RAM to load both tables completely into RAM and perform the join in RAM. Therefore, joining the customer table with the sales table requires loading a record from the sales table, identifying the customer number in that record, searching the customer table to locate a record for that customer, loading the record for that customer into RAM, and creating a new record combining the sales and customer information. This requires the computer to access the disk for each record in the sales database, or one million times. The join algorithm outlined above is known as a (simple) nested-loop join algorithm. It is relatively inefficient but it is used here to outline the basic idea of join processing. There are other more efficient join algorithms (hash join, merge join, etc.) but they are considerably more complex and will not be discussed in detail herein. Those skilled in the art will be familiar with the intricacies of these algorithms.

The bulk of the processing overhead in the query described above is related to the join operation. This is clear, since the join operation requires accessing the disk for each record. In this example, the disk is accessed one million times. The time required for a disk access operation is significantly large in comparison to other computer operations. Therefore, the join operation and the disk accesses required therein are prime targets for any endeavor to reduce processing overhead.

If the records used for input to the join operation are reduced, then the overhead of the join operation is also reduced. One way in which the input records to a join operation can be reduced is to perform an additional aggregation—a "pre-aggregation"—prior to computing the join. Continuing on the example query, the total sales per customer could be computed first by processing only the sales table, then joining the resulting table with the customer table.

While this reduces the input to the join, significant overhead is still required for the pre-aggregation. This is because a pre-aggregation operation is held to the same standard as any aggregation operation. That is, the pre-aggregation operation performs a complete aggregation, producing just a single output record for each customer.

SUMMARY

The implementations described herein concern a "partial pre-aggregation" operation that is similar to an aggregation, but that does not necessarily continue the aggregation process until there is only one output record for each group. The partial pre-aggregation provides a result that reduces the number of records for input into a subsequent operation, but requires less overhead than a complete pre-aggregation.

Referring to the example above, if partial pre-aggregation is performed on the records prior to performing the join, the number of records input to the join operation can be significantly reduced. If the partial pre-aggregation happens to output an average of five records for every customer, the records input to the join will be reduced from one million to fifty thousand. This is not as complete as a full pre-aggregation, which would reduce the number of records to ten thousand. However, the cost savings are significant.

In a partial pre-aggregation, when a new input record (representing an invoice) is received from the disk into RAM, a determination is made as to whether the input record belongs to the same customer as an aggregation record already in a record store created for the partial pre-aggregation. (An aggregation record stores the customer number and a running total of the sales for that customer.) If so, the new record is combined with the aggregation record in the record store. Therefore, what were once two records is now one. If the input record does not belong to the same customer as any of the aggregation records already in the record store, a new aggregation record for that customer is created in the record store, if there is sufficient space for another record in the record store. If the record store is full, space is vacated by outputting one or more of the aggregation records to a subsequent operation. Note that aggregation records are never output to disk as part of the partial pre-aggregation process but are immediately passed on to the next operator.

It is not always most efficient to perform a partial pre-aggregation on a record store prior to a subsequent operation, such as a join. Therefore, one implementation described herein includes a query optimizer that provides an estimate of the number of records that will be output from a partial pre-aggregation. If the query optimizer suggests that the cost of a partial pre-aggregation will outweigh the benefits, the query will process the records without performing a partial pre-aggregation. If the query optimizer suggests that a partial pre-aggregation will be more efficient, then the partial pre-aggregation is performed as a part of the query.

In another implementation, a special case is described in which the grouping columns are the same for the partial pre-aggregation and the join. In such a case, the partial pre-aggregation and the join can be processed together, as opposed to them being processed sequentially.

In this implementation, a batch of records is input to a record store up to a capacity of records that the record store can store (or until there are no more records to input). If the query optimizer determines that a partial pre-aggregation is in order, aggregation is performed on the records as they are loaded into the record store. This reduces the number of records in the record store to one record for each customer represented by a record in the record store. (Note that a customer represented by a single record in the record store may also be represented by several more records waiting to be input into the record store; thus, this is a partial pre-aggregation.)

Once the pre-aggregation operator has filled the record store with aggregation records, a join is performed using the records in the record store and the resulting joined records are output to a subsequent operator. This prevents the join operation from having to create its own record store, thereby saving a significant amount of memory. When the join is completed, the records in the record store are discarded. If the subsequent operator is not an aggregation, then an aggregation will ultimately be performed on all the records to produce the desired output.

BRIEF DESCRIPTION OF THE DRAWINGS

FIG. 4 is an illustration of a sales table.

FIG. 5 is an illustration of a customer table.

FIG. 6a is an illustration showing a first group of aggregation records output to a join operator as a result of applying partial pre-aggregation to the sales table.

FIG. 6b is an illustration showing a second group of aggregation records output to a join operator as a result of applying partial pre-aggregation to the sales table.

FIG. 7 is an illustration showing a result of applying a join operation to the result of the partial pre-aggregation and the customer table.

FIG. 8 is an illustration showing a result of aggregating the result of the join operation.

FIG. 10 is an illustration showing a result of aggregation on records output from a record store.

DETAILED DESCRIPTION

Figure 1:
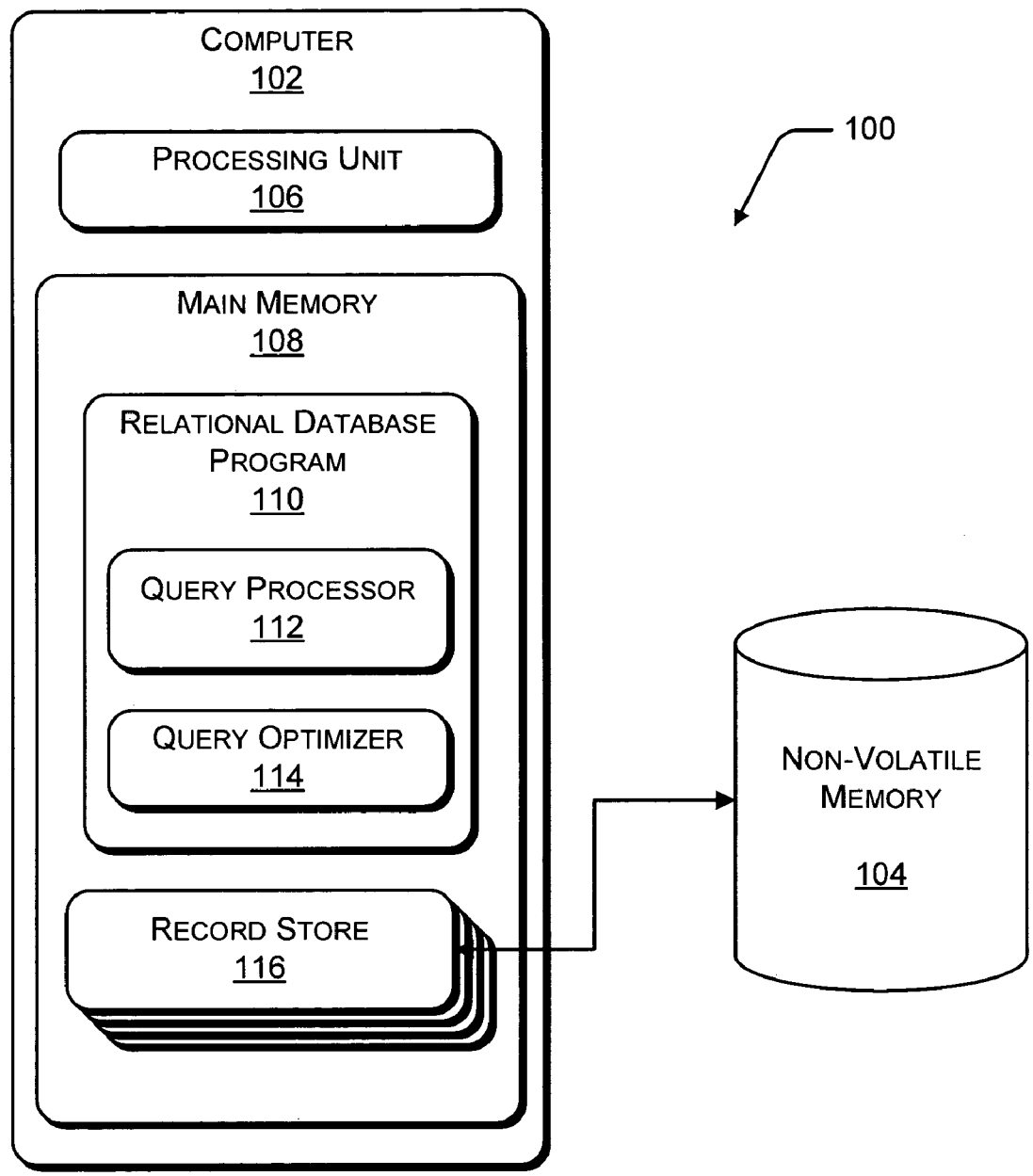
FIG. 1 shows a relational database computer system.

FIG. 1 shows a relational database system 100 having a computer 102 and a non-volatile memory 104 interfaced with the computer 102. The computer 102 has a processing unit 106 and a main memory 108. The main memory 108 is volatile memory and can be implemented, for example, as volatile RAM (Random Access Memory). The non-volatile memory 104 provides permanent storage for relational database records. The non-volatile memory 104 can be implemented in a variety of ways, including disk arrays, disk drives (e.g., hard and floppy), read/write CD ROMS, tape backups, reel-to-reel, and the like.

The relational database system 100 is shown in an operational state in which a relational database program 110 is loaded in main memory 108 for execution on the processing unit 106. The relational database program 110 is permanently stored on non-volatile memory 104 and loaded into the main memory 108 when launched. An example of a relational database program is the SQL Server program sold by Microsoft Corporation. It is also noted that aspects of this invention concerning query processing may be used in other types of programs that may employ relational database concepts, such as spreadsheet programs, accounting software, workflow management software, and the like.

The relational database program 110 has a query processor 112, which is a program that implements aspects of the embodiments described herein. The relational database program also includes a query optimizer 114, which examines a query and the data to be processed by the query to determine the optimum manner in which the query should be processed.

Some operators, in particular, join and aggregation operators, require main memory space for storing records during processing. This type of working storage is here referred to as a "record store". A portion of the main memory 108 is shown as being assigned to record stores 116 created and used by various operators. Note that records stores are not permanent but created and destroyed by operators as needed. Neither are they all of the same size—different operators may use record stores of different size. The relational database system 110 is representative of many diverse implementations, including a stand-alone computer, a database server for a network of PCs or workstations, an online sewer for Internet service providers, a mainframe computing system, and the like. The relational database system 110 runs on top of an operating system (not shown), which is preferably a multitasking operating system that allows simultaneous execution of multiple applications or multiple threads of one or more applications. Examples of applications. Examples of suitable operating systems include a Windows brand operating system sold by Microsoft Corporation, such as the Windows NT workstation operating system, as well as UNIX based operating systems.

Figure 2:
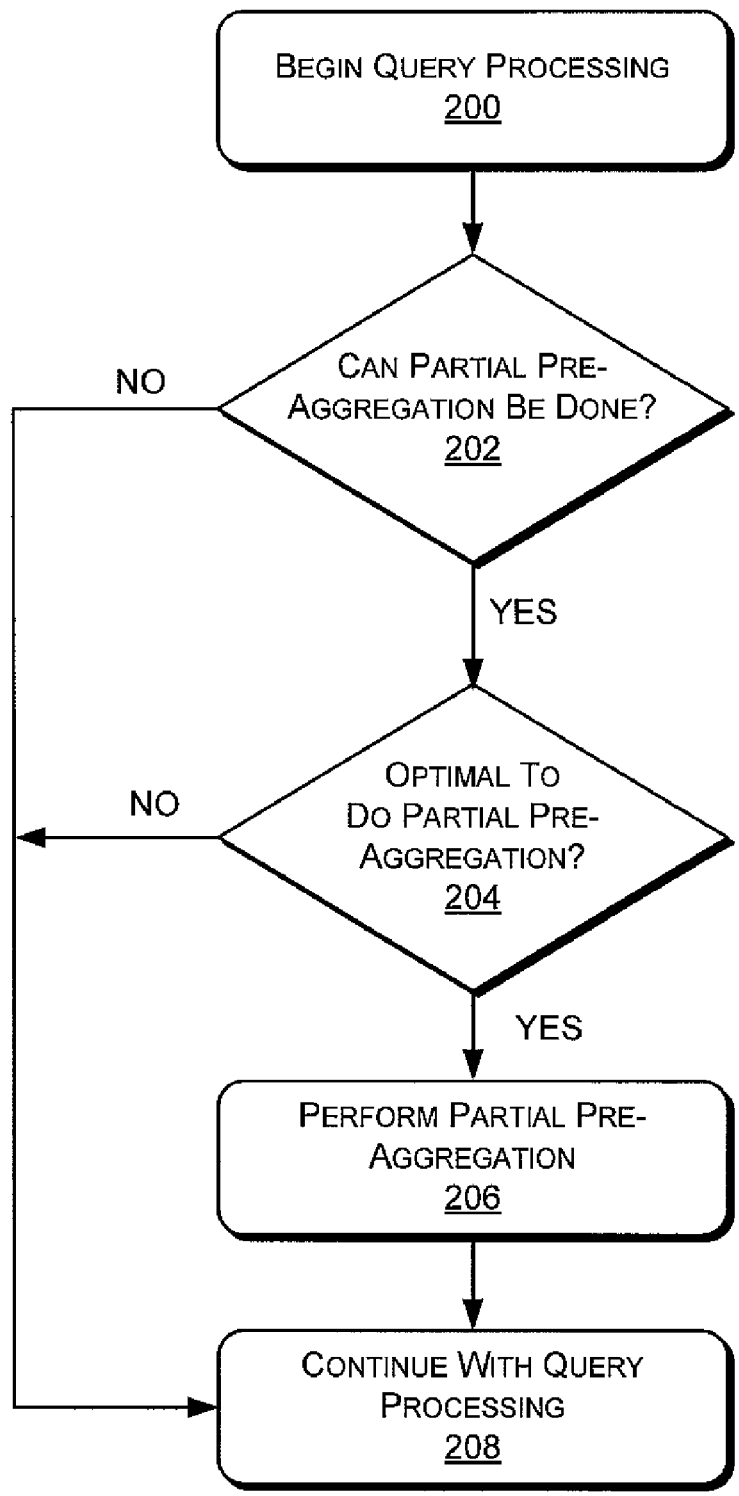
FIG. 2 is a flow diagram of a method utilizing a partial pre-aggregation operation.

FIG. 2 is a flow diagram of a method utilizing partial pre-aggregation according to the embodiments described herein. At step 200, the query processor 112 of the relational database program 110 begins to process a query. For discussion purposes, the query includes a join operation followed by an aggregation operation.

The relational database program 110 invokes the query optimizer 114 to examine the query and the data to be processed by the query to determine if the query is one on which partial pre-aggregation can be performed (step 202). If the query includes an aggregation operation, then it may be possible to perform a partial pre-aggregation as part of the query. Partial pre-aggregation can be applied wherever there is a column set that functionally determines the final grouping columns. In other words, whenever grouping and aggregating is done on a column set "G," pre-aggregation can be performed on any column set that functionally determines "G." Determining when a pre-aggregation can be performed is known in the art.

If it is not possible to perform a partial pre-aggregation, then there is no need to determine if partial pre-aggregation should be done to economize overhead. In that case, the query processor 112 simply continues to process the query without performing a partial pre-aggregation at step 208 ("NO" branch, step 202). If, however, it is possible to perform a partial pre-aggregation ("YES" branch, step 202), the query optimizer 114 analyzes the query to estimate the benefits of running a partial pre-aggregation as opposed to the costs of performing a partial pre-aggregation (step 204).

Several mathematical models are available and known in the art that can be used for this estimation. However, a refined mathematical model is described below that may be used to provide more accurate estimates than previous models.

Mathematical Model

If an input stream (records that are input to be processed) contains D distinct groups, complete aggregation reduces the input to exactly D output records. Partial aggregation will output more than D records. Exactly how many more depends on several factors, such as the amount of memory available, the number of groups, the group size distribution, and the ordering of the input. For the present example, it is assumed that the input is a stream of randomly selected records.

Assume that the input records are divided among D different groups, labeled 1, 2, . . . , D, and that $p_i$ denotes the probability that a record belongs to group i. ($p_1, p_2, \ldots p_D$, is a group size distribution). The actual group labels (grouping column values) do not matter for mathematical model purposes, but it is assumed that $p_1 \geq p_2 \geq p_D$.

Group size distribution is modeled as a generalized Zipf distribution that is defined by:

$$p_i = (1/c)(1/i)^\alpha, i = 1, 2, \ldots, D \quad c = \sum_{i=1}^{D} (1/i)^\alpha$$

where $\alpha$ is a positive constant.

Setting $\alpha=1$ gives the traditional Zipf distribution and $\alpha=0$ gives a uniform distribution. Increasing $\alpha$ increases the skew in the distribution, which increases the data reduction obtained by partial aggregation.

An input record will either be absorbed by a group already in memory or will create a new group. Group labels are modeled as being independently and randomly drawn from the distribution $p_1, p_2, \ldots p_D$. The expected number of distinct group labels occurring in a sample of n records (where n denotes the number of records read so far) equals:

$$G(n) = D - \sum_{i=1}^{D} (1-p_i)^n$$

where $(1-p_i)^n$ is the probability that no record with group label i occurs among the n input records. Note that the function G is also well defined for non-integer arguments.

An absorption rate at point n—the probability that record n+1 will be absorbed into one of the groups already in memory—is calculated as:

$$A(n) = 1 - (G(n+1) - G(n)) = \sum_{i=1}^{D} (1-p_i)^n$$

where G(n+1)−G(n) is the probability that record n+1 will not be absorbed.

The number of input records expected to be processed before the memory reaches capacity (R(M)) (assuming that there is memory space for storing, at most, M group records and that M<D) is the inverse of the function G:

$$R(M) = G^{-1}(M).$$

R(M) is computed by solving M=G(X) for X.

R(M) is substituted into function A, below, to obtain an estimate of the absorption rate obtained when storing M group records in memory. This function equals:

$$A(R(M)) = 1 - \sum_{i=1}^{D} (1-p_i)^{R(M)}$$

A(R(M)) is a measure of the "absorption power" of memory space for M group records. If the input consists of N records (N>D), the number of output records can be estimated as:

$$T(N) = M + (N-M)(1 - A(R(M))) = M + (N-M) \sum_{i=1}^{D} (1-p_i)^{R(M)}.$$

This function applies to replacement policies that always leave the last M distinct values encountered in the input stream in memory.

T(N) provides the number of output records for N input records. Therefore, an estimate can be made of the number of output records when the number of input records is known or can be reasonably estimated. If the estimated number of output records is significantly less than the number of input records, it is beneficial to apply partial pre-aggregation.

Note that for the special case of uniform distribution ($p_i=1/D$), closed formulas for the four functions are:

$$G_U(n)=D(1-1/D)^n)$$

$$R_U(M)=\log_{(1-1/D)}(1-M/D)=ln(1-M/D)/ln(1-1/D)$$
where $M=G^{-1}$.

$$A_U(R_U)(M))=M/D$$

$$T_U(N)=M+(N-M)(1-M/D)$$

Referring now back to FIG. 2, if the query optimizer 114 indicates that it would be cost efficient to perform a partial pre-aggregation ("YES" branch, step 204), then the query processor 112 performs the partial pre-aggregation at step 206. Details of the partial pre-aggregation will be discussed below with reference to FIG. 3. If the query optimizer 114 determines that no cost savings will be realized from performing a partial pre-aggregation ("NO" branch, step 204), then the query processing is continued at step 208.

It is noted that the partial pre-aggregation operator is a "non-blocking" or "streaming" operator, which means that it may generate output records before it receives all the input records it is to process. This is a significant advantage of partial pre-aggregation, since it can run concurrently with a subsequent operator, such as a join. Therefore, it is noted that step 206—"Perform Partial Pre-Aggregation"—may be processed concurrently as a part of the query and not necessarily sequentially, or separate from the processing of other operators. In other words, other operators may be running concurrently with the partial pre-aggregation and, therefore, would not necessarily fall sequentially within the flow chart of FIG. 2.

The steps depicted in FIG. 2 will be revisited below, with reference to a specific example outlined in FIGS. 4-8.

Figure 3:
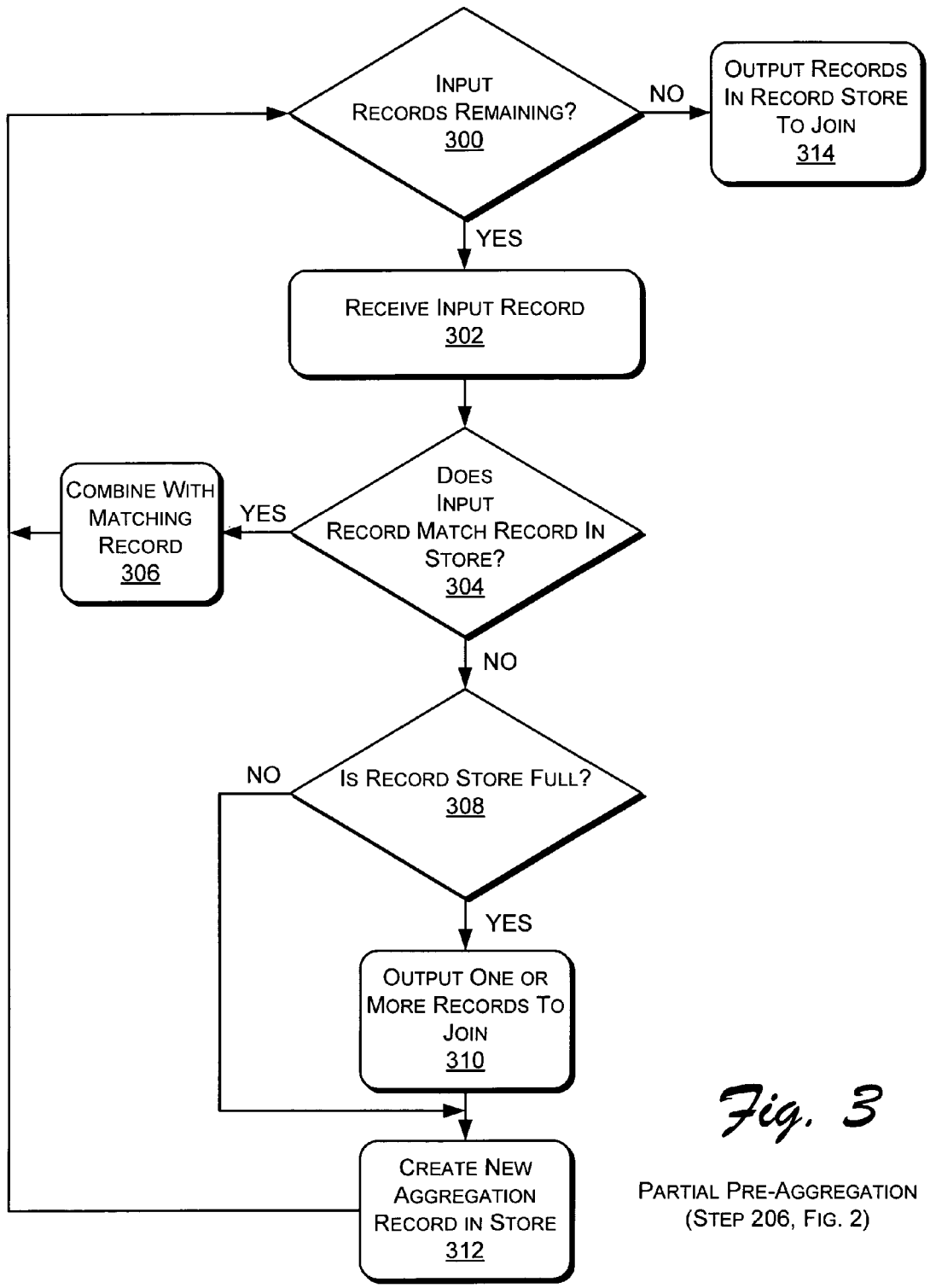
FIG. 3 is a flow diagram of a partial pre-aggregation operation.

FIG. 3 is a flow diagram depicting the steps of a partial pre-aggregation. The steps outlined in FIG. 3 comprise the details of step 206 of FIG. 2.

At step 300 of FIG. 3, the relational database program 110 performs a check to determine if there are input records available for processing. If so ("YES" branch, step 300), an input record is received by the partial pre-aggregation operator at step 302. This input record may be stored in a partitioned area of the main memory 108, depending on the implementation used. Other memory partitions may be utilized for processing programs, hashing, partitioning, etc.

If the value of the grouping column(s) of the input record matches the grouping column(s) of an aggregation record already in the operator's record store 116 (step 304), then the input record is combined with the matching record at step 306 and the process reverts to step 300.

If, however, no match is found ("NO" branch, step 304), then a new aggregation record matching the input record must be added to the record store 116. Before that can be done, the relational database program 110 determines if the record store 116 is full at step 308, the record store 116 having a capacity to store a limited number of records. It will be appreciated that the record store 116 may actually hold any practicable number of records.

If the record store 116 is not full ("NO" branch, step 308), then the new aggregation record is created and stored in the record store 116 at step 312 and the process again reverts to step 300. If the record store 116 is full ("YES" branch, step 308), then some of the existing aggregation records in the record store 116 are output to the subsequent join operator at step 310.

Note that the record store 116, at this point, contains only one record for each value of the grouping column (customer number). Once the pre-aggregation operator has output an aggregation record to the join operator, the record is deleted from the record store. Suppose the record output was related to a customer with customer number 1234. The input stream may contain additional invoices for customer 1234, in which case a new aggregation record will be created for customer 1234 and eventually output to the join operator. In other words, the output stream from pre-aggregation may contain multiple records related to the same customer, each one covering a subset of that customer's invoices. Traditional, complete aggregation always outputs a single record for each customer. This is the difference between partial pre-aggregation and pre-aggregation. However, this will not affect the final output since a final aggregation will ultimately be performed on the results of the partial pre-aggregation.

When there are no more records to be input ("NO" branch, step 300), all remaining aggregation records in the record store are output to the join operator. This ensures that all the records are eventually output to the join operator.

The theory of partial pre-aggregation can be more easily explained using a practical example. Suppose that a business administrator wants an output that lists a total of all the sales for a certain year made to each customer of the business, together with a contact (person) for each customer and a telephone number for the contact.

The administrator has a database system that includes a sales table for the year desired that contains a record for each invoice, each record showing, among other things, the customer number and the amount of sales for that particular invoice. The database system also includes a customer table that contains a record for each customer of the business, each record showing, among other things, the contact for that customer and a telephone number for that contact. Note that since the administrator needs information from two tables, there will be a join operation in the query. Also, since the information sought by the administrator includes grouping by customer number, there will be an aggregation operation in the query.

FIG. 4 shows a sales table 400 for the example outlined above. The sales table 400 includes six rows, or records, identified as record 1 402, record 2 404, record 3 406, record 4 408, record 5 410 and record 6 412. It is noted that although six records are shown, the sales database can contain any practicable number of records.

The sales table 400 also includes four columns, or fields. These are customer number 414, invoice date 416, due date 418 and invoice amount 420. (The invoice date 416 and due date 418 are not shown as they are not relevant to the following discussion).

For record 1 402, the customer number 414 is "9810" and the invoice amount 420 is $100. For record 2 404, the customer number 414 is "9815" and the invoice amount 420 is $200. For record 3 406, the customer number 414 is "9810" and the invoice amount 420 is $300. For record 4 408, the customer number 414 is "9821" and the invoice amount 420 is $400. For record 5 410, the customer number 414 is "9810" and the invoice amount 420 is $500. For record 6 412, the customer number 414 is "9821" and the invoice amount 420 is $600.

FIG. 5 shows a customer table 500 for the example outlined above. The customer table 500 includes four rows, or records, identified as record 1 502, record 2 504, record 3 506, and record 4 508. It is noted that although six records are shown, the sales table can contain any practicable number of records.

The customer table 500 also includes four columns, or fields. These are customer number 510, customer name 512, customer contact 514, and contact phone 516. (The customer names 514 are not shown because they are not relevant to the following discussion). For record 1 502, the customer number 510 is "9810," the customer contact 514 is "Adams" and the contact phone is 123-4567. For record 2 504, the customer number 510 is "9815," the customer contact 514 is "Bethard" and the contact phone 516 is 345-6789. For record 3 506, the customer number 510 is "9819," the customer contact 514 is "Gill" and the contact phone 516 is 987-6543. For record 4 508, the customer number 510 is "9821," the customer contact 514 is "Danner" and the contact phone 516 is 765-4321.

Referring back to FIG. 2 with continuing reference to the sales table 400 of FIG. 4 and the customer database 500 of FIG. 5, the query processing begins at step 200. At step 202, the query processor 112 determines that a partial pre-aggregation can be performed since the query requires grouping columns, i.e., an aggregation.

At step 204, the query optimizer 114 determines that it would be cost efficient to perform a partial pre-aggregation on the sales table prior to the join (assumed in this example). The partial pre-aggregation is executed at step 206.

FIG. 3 shows the details of the partial pre-aggregation, which begins at step 300, when the query processor 112 verifies that there are input records to load into the record store 116, created for this purpose by the pre-aggregation operator.

At step 302, record 1 402 of the sales table 400 is input into the main (volatile) memory 108, specifically, the record store 116. At step 304, the value of the grouping column (customer number 414 "9810" for this example) of record 1 402 is checked for a match with an aggregation record already in the record store 116. Since no other records have been processed yet, there is no match. The query processor 112 then determines whether the record store 116 is full at step 308. For this example, assume that the record store 116 can contain only two records, although it is noted that, in practice, the record store 116 can contain a much larger number of records. For this example, it is more convenient to discuss the record store 116 as having a small capacity.

After confirming that there is room in the record store 116 for another record, record 1 402 is added to the record store 116 (step 312) and the process reverts to step 300, where it is determined that there are more input.

At step 302, record 2 404 of the sales table 400 is input into record store 116. At step 304, the value of the grouping column of record 2 404 ("9815") is checked for a match with an aggregate record in the record store 116. Since the only record in the record store 116 has the customer number "9810," there is no match. Therefore, record 2 404 is added to the record store 116 at step 312 after determining that there is room in the record store 116 (step 308). The process reverts again to step 300.

There are still input records to process, so at step 302, record 3 406 is input into the record store 116. At step 304, the value of the grouping column of record 3 406 ("9810") is checked for a matches with an aggregate record in the record store 116. The value of the grouping column for record 3 matches the record in the record store 116 having the value "9810" for the grouping column. Therefore, at step 306, the records are combined by summing the invoice amount 420 fields of the records.

More records are available to be input at step 300, so record 4 408 is input into the record store 116 at step 302. The grouping column value of record 4 408 ("9821") does not match a grouping column value of any record in the record store 116 ("9810," "9815"). The record store 116 is checked at step 308 to determine if it has reached capacity. Since there are now two records in the record store 116, the record store 116 cannot accept record 4 408. Therefore, at least one aggregation record in the record store 116 is output to the subsequent join operator at step 310. Assuming all the aggregation records in the record store 116 are output to the join, the record store 116 is now empty. Therefore, at step 312, record 4 408 is added to the record store 116.

FIG. 6a shows the first group of aggregation records output from the record store 116 to the join operator. The aggregation records are record 1 602 and record 2 604. Record 1 602 contains the customer number 606 "9810" and a total invoice amount 608 of "$400." The figure of $400 was derived from adding the first record for customer number "9810," which had an invoice amount of $100, to the second record for customer number "9810," which had an invoice amount of $200. Record 2 604 contains the customer number 606 "9815" and a total invoice amount 608 of "$200." This is the same as the only record previously stored for customer number 9815.

Referring back to FIG. 3, step 300, there are more records to input, so at step 302, record 5 410 is received into the record store 116 of the main memory 108. At step 304, the value of the grouping column of record 5 410 ("9810") is checked against the aggregation records in the record store 116 for a matching grouping column value. Since all records having customer number "9810" as the grouping column value have been output to the join operator, no match is found. The record store 116 is checked for capacity at step 308 and, since it is not full, record 5 410 is added to the record store 116 at step 312.

There are more records to input (step 300) so record 6 412 is input into the memory pate 116. At step 304, the value of the grouping column of record 6 412 ("9821") is checked for a match with the value of the grouping column of the aggregation records in the record store 116. Since there is a record in the record store 116 that has the grouping column value "9821," record 6 412 is combined with the aggregation record in the record store 116 and the invoice amounts 420 for record 6 412 and the matching aggregation record are summed into one record.

At step 300, there are no more input records to process, so the aggregation records remaining in the record store 116 are output to the join operator at step 314. In this case, the record store 116 happens to be filled to capacity. However, it is noted that the contents of the record store 116 will be output to the join operator even if it is not full when there are no further records to process.

It is also noted that records may be input into the record store 116 when the record store 116 is full as long as the value of the grouping column of the input record matches the value of the grouping column of an aggregation record in the record store 116. This is because the input record will be combined with the aggregation record and the number of aggregation records will not increase.

FIG. 6b shows the second group of aggregation records output to the join operator. The aggregation records in FIG. 6b are record 1 610 and record 2 612. Record 1 610 contains the customer number 614 "9821" and a total invoice amount 616 of "$1000." The figure of $1000 was derived from adding the first record for customer number 9821, which had an invoice amount of $400, to the second record for customer number 9821, which had an invoice amount of $600. Record 2 612 contains the customer number 614 ("9810") and the total invoice amount 616 "$500." This is the same as the only record previously stored in the record store 116 for customer number 9810.

FIGS. 6a and 6b have now been output to the join operator. It is clear that the results of the partial pre-aggregation are less complete than the result would be for a complete pre-aggregation or aggregation. This is because there are two records for customer number 9810 that have been output to the join operation. As will be seen, however, this won't matter in the end because the final aggregation will provide an output conforming to a complete aggregation. It can also be seen in FIGS. 6a and 6b that the partial pre-aggregation has significantly reduced the number of records that will be input into the subsequent join operation.

If the partial pre-aggregation had not been performed prior to the join operation, there would be six records to input to the join. Performing the partial pre-aggregation reduced that number to four records. This reduction seems small in the example provided, but the reduction is on the order of one-third, which is significant. If there are several thousand or million records to begin with, the significance of the amount of overhead that can be saved by performing a partial pre-aggregation will be appreciated.

Now referring back to FIG. 2, at step 208, the query processing continues with the join operation and the aggregation. FIG. 7 shows the join result 700, which has joined the results of the partial pre-aggregation with the customer contact 514 and the contact phone 516 from the customer table 500 (FIG. 5).

The join results 700 include four records. Record 1 702 contains customer number 710 "9810," customer contact 712 "Adams," contact phone 714 "123-4567" and total sales 716 "$400." Record 2 704 contains customer number 710 "105," customer contact 712 "Bethard," contact phone 714 "345-6789" and total sales 716 "$200." Record 3 706 contains customer number 710 "9821," customer contact 712 "Danner," contact phone 714 "987-6543" and total sales 716 "$1000." Record 4 708 contains customer number 710 "9810," customer contact 712 "Adams," contact phone 714 "123-4567" and total sales 714 "$500."

After the join is complete, an aggregation operation is performed on the join results 700. FIG. 8 shows the aggregation result 800, which has three records. Record 1 802 includes customer number 808 "9810," customer contact 810 "Adams," contact phone 812 "123-4567" and total sales 814 "$900." Record 2 804 includes customer number 808 "9815," customer contact "Bethard," contact phone 812 "345-6789" and total sales 814 "$200." Record 3 806 includes customer number 808 "9821," customer contact "Danner," contact phone 812 and total sales 814 "$1000."

The pre-aggregation eliminates a significant number of redundant customer records and the query has provided the output initially requested—the total sales for each customer together with the customer contact and the contact phone number—while drastically reducing the overhead required to process the query.

Combining Partial Pre-Aggregation and Join

For the special case when the grouping columns are the same as the join columns, pre-aggregation can be combined with the join to utilize a single record store. A pre-aggregation is performed on records as they are input to a record store. When the record store is full, the records are immediately joined with other data and the resulting joined records are output to a subsequent operator.

Figure 9:
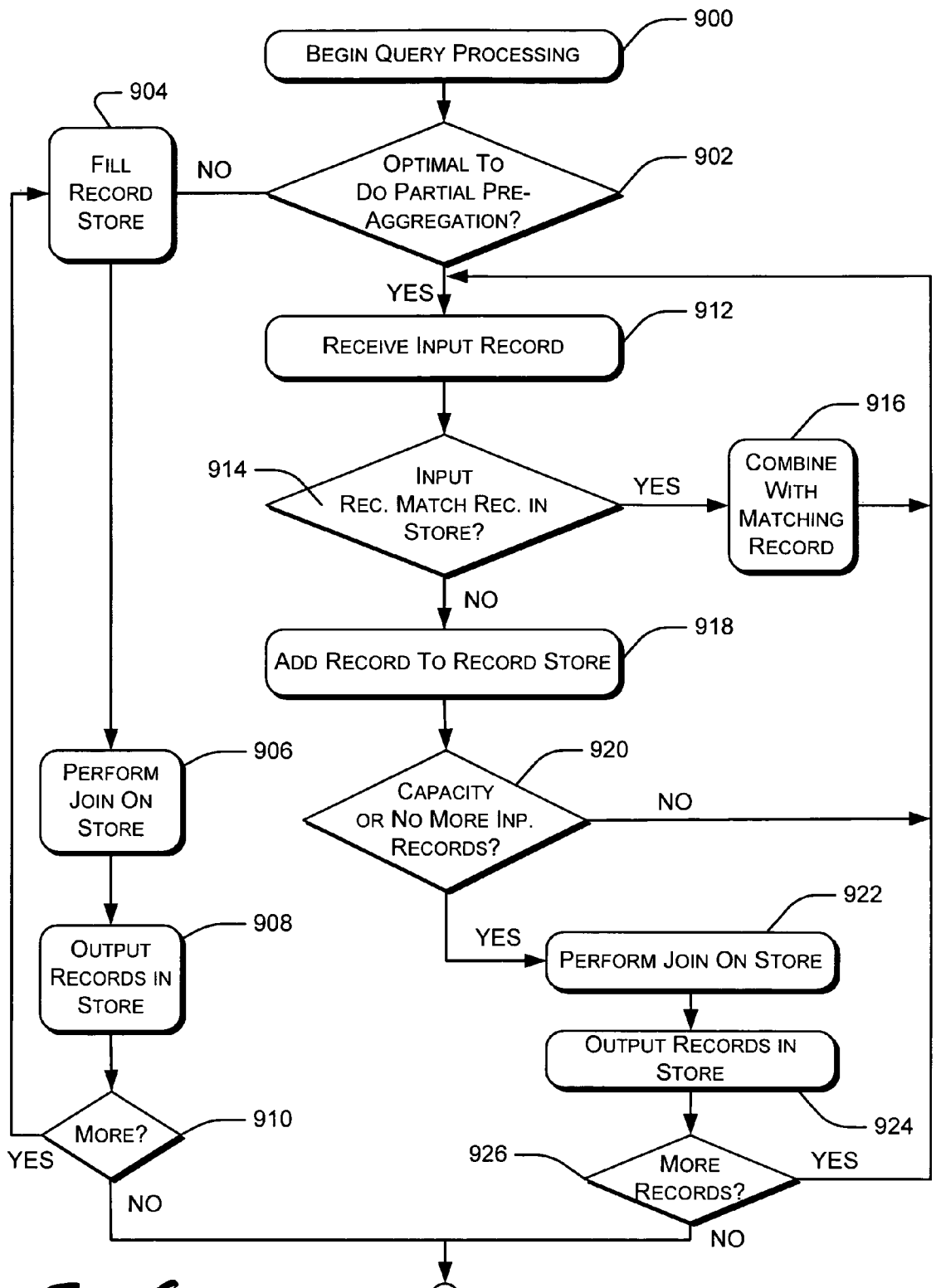
FIG. 9 is a flow diagram of a method utilizing a single record store for a partial pre-aggregation operation and a join operation.

FIG. 9 shows that processing a query begins at step 900. At step 902, the query optimizer 114 is invoked by the query processor 112 to determine if an aggregation operation —a partial pre-aggregation—should be performed as a part of the query. If it is determined that a partial pre-aggregation would not be efficient ("No" branch, step 902), the several records are input to the record store 116. When the record store is full, a join operator is applied to the records in the record store 116 at step 906. When the join has concluded processing, the records in the record store 116 are no longer needed and the record store is cleared at step 908. If there are more records to process at step 910, then the process returns to step 904 and another batch of input records are loaded into the record store 116 ("Yes" branch, step 910). If there are no more records ("No" branch, step 910), then the process is terminated.

If it is determined that a partial pre-aggregation should be performed as part of the query ("Yes" branch, step 902), then a single input record is received at step 912. The records in the record store 116 are searched at step 914 to determine if there is a record in the record store 116 having the same grouping column value as the input record. In the present example, the grouping column is the customer number field from the sales table. If there is a match between the input record and a record in the record store 116 (37 Yes" branch, step 916), then the input record is combined with the matching record at step 916 and a new input record is received at step 912. Combining records in the present example consists of adding the invoice amount from the input record to the aggregate invoice amount of the matching record in the record store. (Note that when an input record is combined with a record in the record store, the number of records in the record store does not increase and, therefore, does not affect the capacity of the record store.)

If there is no record in the record store 116 that matches the input record ("No" branch, step 914), then at step 918, the input record is added to the record store. At step 920, the record store 116 is checked to determine if it has reached its capacity. If not ("No" branch, step 920), then the process reverts to step 912 and another input record is received.

If the record store 116 is full to capacity ("Yes" branch, step 920), then at step 922, a join operation is performed on the records in the record store to combine other data with the records. In the present example, the customer number and aggregate invoice amount for each record in the record store is joined with the customer contact and contact phone information from the customer table. The join operation is any type of known join operation, such as a nested loop join, a simple hash join, a classical hash join, etc. When the join operation is completed, the records in the record store no longer needed and the record store is cleared. In the present example, the groups of records output from the join are aggregated to produce one output record for each customer number.

At step 926, it is determined if there are more records to input. If there are more records to process ("Yes" branch, step 926) then the process reverts to step 912 and another input record is received for processing. If there are no more records to process, then the process terminates.

FIG. 10 shows the records that result from aggregating the groups of records output from the partial pre-aggregation/join procedure. Record 1 980 includes customer number 986 ("9810"), customer contact 988 ("Adams"), contact phone 990 ("123-4567") and total sales 992 ("$900"). Record 2 982 includes customer number 986 ("9815"), customer contact 988 ("Bethard"), contact phone 990 ("345-6789") and total sales 992 ("$200"). Record 3 984 includes customer number 986 ("9821"), customer contact 988 ("Danner"), contact phone 990 ("987-6543") and total sales 992 ("$1000").

Note that the final records output from the query are identical in FIG. 8 and in FIG. 10. But the implementation that utilized a combination of a pre-aggregation and a join required less memory and processing to complete than the first described implementation. The memory savings are on the order of one-half.

Conclusion

The implementations described herein provide a relational database computer system with the means to optimize certain queries beyond what is currently known in the art. The implementation of the partial pre-aggregation technique is relatively simple, and the additional provision of the query optimizer ensures that partial pre-aggregation will only be performed when it increases the overall efficiency of the query.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer-readable media comprising computer-executable instructions for processing a database query, the computer-executable instructions comprising instructions for:
estimating costs and benefits of a partial pre-aggregation, wherein an estimate of a number of records that would be output from the partial pre-aggregation is based on a formula having inputs comprising: a memory space for group records, M; a number of input records, N, N being greater than a number, D, of records after full aggregation; and an absorption power term, wherein the absorption power term comprises a summation of D terms, each term including a probability of a record belonging in a group of records;
if indicated by the estimate, partially pre-aggregating records in a database according to a single grouping column to provide a result that contains at least two records having like grouping column values; and
aggregating records derived from the partial pre-aggregation to provide a result that contains records having unique grouping column values.

2. The one or more computer-readable medium as recited in claim 1, wherein the partially pre-aggregating further comprises instructions for:
maintaining a record store in memory, the record store having one record for each different grouping column value encountered in the operation;
receiving a new record;
combining the new record with a record having the same grouping column value, if such a record exists; and
adding the new record to the record store in the memory if there is no record in the record store that has the same grouping column value as the new record.

3. The one or more computer-readable medium as recited in claim 2, further comprising instructions for:
adding additional new records to the record store until the record store reaches a capacity such that it can accept no new records; and
outputting one or more records from the record store to a subsequent database operator.

4. The one or more computer-readable medium as recited in claim 3, wherein after the one or more records have been output to the subsequent database operator, the instructions for adding and outputting are repeated until there are no new records to process.

5. The one or more computer-readable medium as recited in claim 4, comprising instructions for outputting any records, remaining in the record store after there are no new records to process, to the subsequent database operator.

6. The one or more computer-readable medium as recited in claim 3, wherein the subsequent database operator comprises instructions for a join.

7. The one or more computer-readable medium as recited in claim 1, wherein the partially pre-aggregating includes instructions for utilizing a hashing function.

8. The one or more computer-readable medium as recited in claim 1, wherein the partial pre-aggregating creates a record store in memory, and wherein the method further comprises utilizing the record store in memory for one or more other database operators.

9. A relational database computer program stored on a computer-readable medium, the relational database computer program comprising:
means receiving a stream of input records;
means for estimating costs and benefits of a partial pre-aggregation of records from the stream of input records and for performing the partial pre-aggregation if indicated, wherein an estimate of a number of records that would be output from the partial pre-aggregation is based on a formula having inputs comprising: a memory space for group records, M; a number of input records, N, N being greater than a number, D, of records after full aggregation: and an absorption power term, wherein the absorption power term comprises a summation of D terms, each term including a probability of a record belonging in a group of records;
means for aggregating the input records in the stream according to a single grouping column as it is received to create a record store; and
means for joining records in the record store with other data;
wherein the records output from the join include at least two records that have an identical grouping column value in the single grouping column.

10. The relational database computer program as recited in claim 9, wherein:
the record store has a capacity that is less than a number of records in the stream of input records; and
the means for aggregating the input records is performed until the record store reaches capacity.

11. A relational database computer program stored on a computer-readable medium, the relational database computer program comprising computer-executable instructions that, when executed on a computer, perform the following steps:
receiving a stream of input records;
estimating costs and benefits of a partial pre-aggregation of records from the stream of input records and for performing the partial pre-aggregation if indicated, wherein an estimate of a number of records that would be output from the partial pre-aggregation is based on a formula having inputs comprising; a memory space for group records, M: a number of input records, N, N being greater than a number, D, of records after full aggregation and an absorption power term, wherein the absorption power term comprises a summation of D terms, each term including a probability of a record belonging in a group of records;

aggregating the input records in the stream according to a single grouping column as it is received to create a record store; and joining records in the record store with other data;

wherein the records output from the join include at least two records that have an identical grouping column value in the single grouping column.

12. The relational database computer program as recited in claim 11, wherein:

the record store has a capacity that is less than a number of records in the stream of input records; and aggregating the input records is performed until the record store reaches capacity.

* * * * *